United States Patent
Prudkovskij

(10) Patent No.: US 12,229,259 B2
(45) Date of Patent: Feb. 18, 2025

(54) METHOD AND SYSTEM FOR DETECTING MALICIOUS FILES IN A NON-ISOLATED ENVIRONMENT

(71) Applicant: F.A.C.C.T. NETWORK SECURITY LLC, Moscow (RU)

(72) Inventor: Nikolay Sergeevich Prudkovskij, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 241 days.

(21) Appl. No.: 17/586,010

(22) Filed: Jan. 27, 2022

(65) Prior Publication Data

US 2022/0164444 A1    May 26, 2022

Related U.S. Application Data

(63) Continuation of application No. PCT/RU2020/000089, filed on Feb. 25, 2020.

(30) Foreign Application Priority Data

Feb. 21, 2020 (RU) .................................. 2020107922

(51) Int. Cl.
*G06F 21/56* (2013.01)
(52) U.S. Cl.
CPC ...... *G06F 21/562* (2013.01); *G06F 2221/033* (2013.01)
(58) Field of Classification Search
CPC .................. G06F 21/562; G06F 2221/033
See application file for complete search history.

(56) References Cited

U.S. PATENT DOCUMENTS 6,928,434 B1    8/2005 Choi et al.
7,225,343 B1    5/2007 Honig et al.
(Continued)

FOREIGN PATENT DOCUMENTS

AU    2017203008 B2    3/2019
CA       2900312 A1    8/2014
(Continued)

OTHER PUBLICATIONS

Office Action with regard to the counterpart U.S. Appl. No. 17/486,428 issued on May 25, 2023.
(Continued)

*Primary Examiner* — Saleh Najjar
*Assistant Examiner* — Devin E Almeida
(74) *Attorney, Agent, or Firm* — BCF LLP

(57) ABSTRACT

A method and a system for detecting malicious files in non-isolated environment are provided. The method comprises, during a training phase: acquiring a plurality of executable files, analyzing a given executable file to obtain: (i) data associated with the given executable file; (ii) a control-flow graph associated with the given executable file, and (iii) a data-flow graph associated with the given executable file; determining, based on the data, parameters of the given executable file; generating, by the processor, based on the parameters, at least a first feature vector and a second feature vector; generating, by the processor, based on the control-flow graph, a third feature vector; generating, by the processor, based on the data-flow graph, a fourth feature vector; and training the each one of ensemble of classifiers based on a respective feature vector to determine if a given in-use executable file is one of malicious and non-malicious.

18 Claims, 5 Drawing Sheets

(56) References Cited

U.S. PATENT DOCUMENTS

| | | |
|---|---|---|
| 7,383,581 B1 | 6/2008 | Moore et al. |
| 7,496,628 B2 | 2/2009 | Arnold et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1 | 3/2014 | Barker |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,165,142 B1 | 10/2015 | Sanders et al. |
| 9,210,111 B2 | 12/2015 | Chasin et al. |
| 9,215,239 B1 | 12/2015 | Wang et al. |
| 9,223,972 B1 | 12/2015 | Vincent et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,516,053 B1 | 12/2016 | Muddu et al. |
| 9,654,593 B2 | 5/2017 | Garg et al. |
| 9,705,904 B1* | 7/2017 | Davis ..................... G06N 3/045 |
| 9,723,344 B1 | 8/2017 | Granström et al. |
| 9,736,178 B1 | 8/2017 | Ashley |
| 9,747,446 B1 | 8/2017 | Pidathala et al. |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1 | 5/2019 | Aziz et al. |
| 10,467,411 B1 | 11/2019 | Pidathala et al. |
| 10,514,909 B2* | 12/2019 | Yahav ....................... G06F 8/75 |
| 10,546,143 B1 | 1/2020 | Wesson |
| 10,783,247 B1 | 9/2020 | Steinfadt et al. |
| 10,990,674 B2 | 4/2021 | Srinivasagopalan et al. |
| 11,023,580 B1* | 6/2021 | Han ...................... G06F 21/564 |
| 11,270,000 B1 | 3/2022 | Chiang et al. |
| 11,663,405 B2 | 5/2023 | Wilson et al. |
| 2002/0161862 A1 | 10/2002 | Horvitz |
| 2003/0009696 A1 | 1/2003 | Bunker et al. |
| 2006/0021029 A1 | 1/2006 | Brickell et al. |
| 2006/0037080 A1 | 2/2006 | Maloof |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2007/0240220 A1* | 10/2007 | Tuvell .................. G06F 21/562 726/24 |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1 | 8/2013 | Aziz et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0178306 A1 | 6/2015 | Yang et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0310010 A1 | 10/2015 | Brenner et al. |
| 2015/0356291 A1 | 12/2015 | Zakorzhevsky et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0057159 A1 | 2/2016 | Yin et al. |
| 2016/0065595 A1 | 3/2016 | Kim et al. |
| 2016/0112445 A1 | 4/2016 | Abramowitz |
| 2016/0127388 A1 | 5/2016 | Cabot et al. |
| 2016/0127907 A1 | 5/2016 | Baxley et al. |
| 2016/0132521 A1 | 5/2016 | Reininger et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0006045 A1 | 1/2017 | Kivva et al. |
| 2017/0034186 A1 | 2/2017 | Buergi et al. |
| 2017/0068816 A1* | 3/2017 | Cavazos ................ G06N 3/084 |
| 2017/0111374 A1* | 4/2017 | Harris ................... G06F 21/564 |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0171230 A1 | 6/2017 | Leiderfarb et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0251003 A1 | 8/2017 | Rostami-Hesarsorkh et al. |

(56) References Cited

U.S. PATENT DOCUMENTS

| | | | |
|---|---|---|---|
| 2017/0262633 A1 | 9/2017 | Miserendino et al. | |
| 2017/0272471 A1 | 9/2017 | Veeramachaneni et al. | |
| 2017/0279818 A1 | 9/2017 | Milazzo et al. | |
| 2017/0286544 A1 | 10/2017 | Hunt et al. | |
| 2017/0289187 A1 | 10/2017 | Noel et al. | |
| 2017/0295157 A1 | 10/2017 | Chavez et al. | |
| 2017/0295187 A1 | 10/2017 | Havelka et al. | |
| 2017/0324738 A1 | 11/2017 | Hari et al. | |
| 2017/0346839 A1 | 11/2017 | Peppe et al. | |
| 2018/0012021 A1 | 1/2018 | Volkov | |
| 2018/0012144 A1 | 1/2018 | Ding et al. | |
| 2018/0025157 A1* | 1/2018 | Titonis | H04W 12/128 726/22 |
| 2018/0034779 A1 | 2/2018 | Ahuja et al. | |
| 2018/0063190 A1 | 3/2018 | Wright et al. | |
| 2018/0096153 A1 | 4/2018 | Dewitte et al. | |
| 2018/0115573 A1 | 4/2018 | Kuo et al. | |
| 2018/0165452 A1 | 6/2018 | Sun et al. | |
| 2018/0268464 A1 | 9/2018 | Li | |
| 2018/0307832 A1 | 10/2018 | Ijiro et al. | |
| 2018/0309787 A1 | 10/2018 | Evron et al. | |
| 2018/0365420 A1 | 12/2018 | Krylov et al. | |
| 2019/0005239 A1 | 1/2019 | Park et al. | |
| 2019/0089737 A1 | 3/2019 | Shayevitz et al. | |
| 2019/0114423 A1 | 4/2019 | Chistyakov et al. | |
| 2019/0158525 A1 | 5/2019 | Rostami-Hesarsorkh et al. | |
| 2019/0207973 A1 | 7/2019 | Peng | |
| 2019/0230098 A1 | 7/2019 | Navarro | |
| 2019/0294720 A1 | 9/2019 | Beringer et al. | |
| 2019/0373005 A1 | 12/2019 | Bassett | |
| 2020/0092306 A1 | 3/2020 | Jusko et al. | |
| 2020/0134702 A1 | 4/2020 | Li | |
| 2020/0162483 A1* | 5/2020 | Farhady | G06N 3/08 |
| 2020/0302058 A1 | 9/2020 | Kenyon et al. | |
| 2020/0364334 A1* | 11/2020 | Pevny | G06F 21/567 |
| 2021/0141897 A1 | 5/2021 | Seifert et al. | |
| 2021/0390182 A1* | 12/2021 | Boutnaru | G06F 21/52 |
| 2023/0252144 A1* | 8/2023 | Kim | G06F 21/564 726/23 |

FOREIGN PATENT DOCUMENTS

| | | | |
|---|---|---|---|
| CN | 103491205 A | 1/2014 | |
| CN | 104504307 A | 4/2015 | |
| CN | 103020494 B | 6/2015 | |
| CN | 105429956 A | 3/2016 | |
| CN | 105897714 A | 8/2016 | |
| CN | 106131016 A | 11/2016 | |
| CN | 106506435 A | 3/2017 | |
| CN | 106713312 A | 5/2017 | |
| CN | 107392019 A | 11/2017 | |
| CN | 107392456 A | 11/2017 | |
| EP | 1160646 A2 | 12/2001 | |
| EP | 2916256 A1 | 9/2015 | |
| EP | 2410452 B1 | 1/2016 | |
| EP | 2743854 B1 | 12/2018 | |
| EP | 2946331 B1 | 8/2019 | |
| EP | 3800570 A1 * | 4/2021 | G06F 21/56 |
| GB | 2425622 A | 11/2006 | |
| GB | 2493514 A | 2/2013 | |
| KR | 10-2007-0049514 A | 5/2007 | |
| KR | 20120090131 A | 8/2012 | |
| KR | 10-1514984 B1 | 4/2015 | |
| RU | 91213 U1 | 1/2010 | |
| RU | 2382400 C2 | 2/2010 | |
| RU | 107616 U1 | 8/2011 | |
| RU | 2446459 C1 | 3/2012 | |
| RU | 129279 U1 | 6/2013 | |
| RU | 2487406 C1 | 7/2013 | |
| RU | 2488880 C1 | 7/2013 | |
| RU | 2495486 C1 | 10/2013 | |
| RU | 2522019 C1 | 7/2014 | |
| RU | 2523114 C2 | 7/2014 | |
| RU | 2530210 C2 | 10/2014 | |
| RU | 2536664 C2 | 12/2014 | |
| RU | 2538292 C1 | 1/2015 | |
| RU | 2543564 C1 | 3/2015 | |
| RU | 2566329 C2 | 10/2015 | |
| RU | 2571594 C2 | 12/2015 | |
| RU | 2580036 C2 | 4/2016 | |
| RU | 2589310 C2 | 7/2016 | |
| RU | 164629 U1 | 9/2016 | |
| RU | 2607231 C2 | 1/2017 | |
| RU | 2610586 C2 | 2/2017 | |
| RU | 2613535 C1 | 3/2017 | |
| RU | 2622870 C2 | 6/2017 | |
| RU | 2625050 C1 | 7/2017 | |
| RU | 2628192 C2 | 8/2017 | |
| RU | 2636702 C1 | 11/2017 | |
| RU | 2654146 C1 | 5/2018 | |
| RU | 2670906 C9 | 12/2018 | |
| RU | 2681699 C1 | 3/2019 | |
| RU | 2702269 C1 | 10/2019 | |
| RU | 2706883 C1 | 11/2019 | |
| RU | 2706896 C1 | 11/2019 | |
| RU | 2708356 C1 | 12/2019 | |
| RU | 2728497 C1 | 7/2020 | |
| RU | 2728498 C1 | 7/2020 | |
| RU | 2738344 C1 | 12/2020 | |
| WO | 0245380 A2 | 6/2002 | |
| WO | 2009/026564 A1 | 2/2009 | |
| WO | 2011/045424 A1 | 4/2011 | |
| WO | 2012/015171 A2 | 2/2012 | |
| WO | 2017/111835 A1 | 6/2017 | |
| WO | 2019/010182 A1 | 1/2019 | |

OTHER PUBLICATIONS

Notice of Allowance with regard to the counterpart U.S. Appl. No. 17/178,320 issued on Oct. 20, 2023.

Lajevardi et al., "A semantic-based correlation approach for detecting hybrid and low-level APTs", Future Generation Computer Systems 96(1), Feb. 2019, 25 pages.

Search Report with regard to RU Patent Application No. 2020110068 completed Sep. 8, 2020.

International Search Report with regard to PCT/RU2020/000140 mailed Nov. 19, 2020.

Search Report with regard to RU Patent Application No. 2020107922 completed Mar. 24, 2020.

International Search Report with regard to PCT/RU2020/000089 mailed Oct. 29, 2020.

English Abstract for CN107392019 retrieved on Espacenet on Dec. 2, 2021.

Notice of Allowance with regard to the U.S. Appl. No. 17/087,775 mailed Nov. 15, 2021.

Search Report with regard to the NL Patent Application No. 2027556 completed Sep. 29, 2021.

Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.

Manuel et al., "A survey on automated dynamic malware-analysis techniques and tools", ACM Computing Surveys, vol. 44, No. 2, Feb. 2012, pp. 1-49.

Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 211-222.

Search Report with regard to EP Patent Application No. EP20924272 completed Nov. 30, 2022.

Chandramohan et al., "A scalable approach for malware detection through bounded feature space behavior modeling", 28th IEEE/ACM International Conference on Automated Software Engineering (ASE), IEEE, 2013, pp. 312-322.

Alahmadi et al., "MalClassifier: Malware family classification using network flow sequence behaviour", APWG Symposium on Electronic Crime Research (ECrime), IEEE, 2018, pp. 1-13.

(56) References Cited

OTHER PUBLICATIONS

Galal et al., "Behavior-based features model for malware detection", Journal of Computer Virology and Hacking Techniques, Springer Paris, vol. 12, No. 2, 2015, pp. 59-67.
Pirscoveanu et al., "Analysis of malware behavior: Type classification using machine learning", International Conference on Cyber Situational Awareness, Data Analytics and Assessment (CyberSA), Centre for Multidisciplinary Research, Innovation and Collaboration, 2015, pp. 1-7.
Office Action with regard to the counterpart U.S. Appl. No. 17/178,320 issued on Apr. 19, 2023.
English Abstract for KR20120090131 retrieved on Espacenet on Apr. 21, 2023.
Github / Linguist, https://github.com/github/linguist accessed on Sep. 24, 2021, pdf 6 pages.
Blackducksoftware / Ohcount, https://github.com/blackducksoftware/ohcount accessed on Sep. 24, 2021, pdf 4 pages.
Search Report with regard to the RU Patent Application No. 2020126232 completed Jan. 28, 2021.
Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.
Grant Decision and Search Report with regard to the RU Patent Application No. 2019139630 completed Jun. 26, 2020.
Dauber et al., "Stylometric Authorship Attribution in Collaborative Documents", Materials of International Conference on Cyber Security Cryptography and Machine Learning (CSCML) 2017, pp. 115-135.
Afroz, Deception in Authorship Attribution, Drexel University, 2013, http://hdl.handle.net/1860/4431, pp. 1-91.
Granin, "TextAnalyzer", https://habr.com/ru/post/114186/ and Machine Translation into English by Yandex Translate on Oct. 21, 2020, pdf 32 pages.
"Authorship Attribution Program by NeoNeuro", https://neoneuro.com accessed Jul. 31, 2020, pdf 5 pages.
"Tools for Software Analysis and Forensic Engineering, S.A.F.E.", https://www.safe-corp.com/index.htm accessed Jul. 31, 2020, pdf 2 pages.
English Abstract for CN 103020494 retrieved on Espacenet on Oct. 21, 2020.
Grant Decision and Search Report with regard to the RU Patent Application No. 2019139628 completed Jun. 26, 2020.
Search Report with regard to RU Patent Application No. 2021108261 completed Feb. 28, 2022.
English Abstract for RU91213 retrieved on Espacenet on Mar. 25, 2022.
Office Action with regard to the counterpart U.S. Appl. No. 15/707,641 mailed Apr. 25, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 {Year: 2005)—in the Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Notice of Allowance with regard to the counterpart U.S. Appl. No. 15/858,013 mailed May 8, 2020.
Office Action with regard to the counterpart U.S. Appl. No. 16/270,341 mailed May 27, 2020.
Notice of Allowance with regard to the counterpart U.S. Appl. No. 15/858,013 mailed Jun. 10, 2020.
Office Action with regard to the counterpart U.S. Appl. No. 16/249,004 mailed Apr. 23, 2021.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 mailed Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.

(56) References Cited

OTHER PUBLICATIONS

English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Notice of Allowance with regard to the U.S. Appl. No. 17/077,132 mailed Oct. 11, 2022.
Search Report with regard to the counterpart Patent Application No. NL 2029433 completed Oct. 18, 2022.
Singh Jagsir et al., "A survey on machine learning-based malware detection in executable files", Journal of Systems Architecture, Elsevier BV, NL, Aug. 2020, pp. 1-24.
Notice of Allowance with regard to the counterpart U.S. Appl. No. 17/486,428 mailed Dec. 13, 2023.
Office Action with regard to the counterpart U.S. Appl. No. 17/685,588 mailed Feb. 27, 2024.

\* cited by examiner

METHOD AND SYSTEM FOR DETECTING MALICIOUS FILES IN A NON-ISOLATED ENVIRONMENT

CROSS-REFERENCE

The present application is a continuation of International Patent Application No.: PCT/RU2020/000089, entitled "METHOD AND SYSTEM FOR DETECTING MALICIOUS FILES IN A NON-ISOLATED ENVIRONMENT," filed on Feb. 25, 2020, the entirety of which is incorporated herein by reference.

FIELD

The present technology relates broadly to the field of cybersecurity, and in particular, to a method and system for detecting malicious files in a non-isolated environment.

BACKGROUND

Certain prior art approaches have been proposed to address the problem of identifying malicious files before launching thereof.

United States Patent Application Publication No.: 2019/0005239-A1, published on Jan. 3, 2019, assigned to Samsung Electronics Co Ltd., entitled "ELECTRONIC DEVICE FOR ANALYZING MALICIOUS CODE AND METHOD THEREFOR", discloses a method for analyzing a malicious code by an electronic device, the method comprising the steps of: receiving an executable file; before the received executable file is installed, analyzing the executable file so as to collect suspected malicious code data from the executable file; normalizing the collected suspected malicious code data and analyzing the same on the basis of a probability model algorithm, so as to make a determination on the suspected malicious code data; and outputting the result of the determination.

Russian Patent No.: 2,654,146-C1, issued on May 16, 2018, assigned to AO Kaspersky Lab, entitled "SYSTEM AND METHOD OF DETECTING MALICIOUS FILES ACCOMPANIED WITH USING THE STATIC ANALYSIS ELEMENTS", discloses a system for acknowledging a file to be malicious, which comprises: a) means for resource extraction intended to: extract resources from the file analyzed; transmit the resources extracted to the rule formation means and rule search means; b) the rule formation means intended to: form at least one rule regulating functional relationship between the obtained resources (hereinafter the rule), while the rule is formed by creating artificial neural network from the resources obtained, where the nodes of the artificial neural network are the means of the obtained resource analysis and relationships between the nodes, formed during creation of the neural network, indicate the functional relationship between the resources obtained; transmit each formed rule to the rule comparison means; c) the rule search means intended to: searching for at least one rule in the malicious file resource base on the basis of the resources obtained; transmit each rule found to the rule comparison means; d) the rule comparison means intended to: compute a degree of commonality between the rules received from the rule formation means and the rule search means; transmit the degree of commonality computed to the decision means; e) the decision means intended to: acknowledge the file analyzed to be malicious if the degree of commonality obtained exceeds the threshold preset.

SUMMARY

It is an object of the present technology to address at least some inconveniences associated with the prior art.

Developers of the present technology have appreciated that the malicious files, such as malicious executable files, can be more effectively detected by analyzing both binary and disassembled versions thereof, which allows receiving a greater amount of data indicative of maliciousness of the files, such as numerical and string parameters thereof. Also, the method and systems described herein are directed to determining file behavior abnormalities based on analyzing control-flow graphs and data flow graphs associated with potentially malicious executable files. Further, non-limiting embodiments of the present technology are directed to training, based on the so retrieved training data, an ensemble of classifiers to determine if a given executable file is malicious or not, which may allow for an improved accuracy of the malicious file detection. In at least some non-limiting embodiments of the present technology, each one of the ensemble of classifiers can be trained based on training data of a respective different data type.

More specifically, in accordance with a first broad aspect of the present technology, there is provided a computer-implementable method for detecting malicious files in non-isolated environment. The method is executable by a processor. The method comprises: during a training phase: acquiring, by the processor, a plurality of executable files including at least one malicious executable file and at least one non-malicious executable file; analyzing, by the processor, a given executable file, the analyzing comprising analyzing both a binary and disassembled form of the given executable file, to obtain: (i) data associated with the given executable file; (ii) a control-flow graph associated with the given executable file, and (iii) a data-flow graph associated with the given executable file; determining, by the processor, based on the data, parameters of the given executable file; determining, by the processor, the parameters of the given executable file as being indicative of one of a malicious executable file and a non-malicious executable file; generating, by the processor, based on the parameters, at least a first feature vector and a second feature vector; generating, by the processor, based on the control-flow graph, a third feature vector; generating, by the processor, based on the data-flow graph, a fourth feature vector, each one of the first feature vector, the second feature vector, the third feature vector, and the fourth feature vector being different from an other one thereof; and training, by the processor, an ensemble of classifiers to determine if a given in-use executable file is one of malicious and non-malicious, the training comprising: training a first classifier of the ensemble of classifiers based on the first feature vector; training a second classifiers of the ensemble of classifiers based on the second feature vector; training a third classifiers of the ensemble of classifiers based on the third feature vector; and training a fourth classifiers of the ensemble of classifiers based on the fourth feature vector; assigning, by the processor, to each one of the ensemble of classifiers, a respective decisive priority value, the respective decisive priority value being indicative of a respective weight assigned to a prediction outcome of a given classifier of the ensemble of classifiers, the respective weight having been determined based on prediction accuracy of the given classifier.

In some implementation of the method, the method further comprises during an in-use phase following the training phase: obtaining, by the processor, the given in-use executable file; generating, by the processor, a first in-use feature vector, a second in-use feature vector, a third in-use feature vector, and a fourth in-use feature vector associated with the given in-use executable file; feeding, by the processor, the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and generating a report including the prediction outcome for presentation thereof to a user.

In some implementation of the method, the first feature vector comprises numerical ones of the parameters of the given executable file, and the second vector comprises string ones of the parameters of the given executable file.

In some implementation of the method, obtaining the data associated with the given executable file comprises obtaining at least one of: metadata, an Import Table, an Export Table, and a Byte/Entropy Histogram, associated with the given executable file.

In some implementation of the method, the analyzing the binary form of the given executable file comprises analyzing at least one of: byte n-grams, data of fields of the given executable file, a file section entropy, metadata, and line length distribution histograms.

In some implementation of the method, the data of the fields of the given executable file comprises at least one of: a number of sections in the given executable file, a size of headers, a code size, an availability of digital signature, an availability of imported DLL and functions where these libraries have been used, names of exported functions, data from a resource catalog, and an assembler version of the given executable file.

In some implementation of the method, the file section entropy has been determined using a sliding window applied to the binary form of the given executable file.

In some implementation of the method, the metadata of the binary form of the given executable file comprises a number of sections in the file, sizes thereof, a presence of a checksum, a file size, a creation time, an operating system version, and an assembler version associated with the given executable file.

In some implementation of the method, analyzing the disassembled form of the given executable file comprises analyzing at least one of: characters, registers, operation codes, a system interface (Windows APIs) access rate, sections, and metadata, associated with the given executable file.

In some implementation of the method, the analyzing further comprises determining, in a code of the disassembled form of the given executable file, a frequency of occurrence of characters, including at least one of: "−", "+" "*", "]", "[", "?", and "@".

In some implementation of the method, the analyzing further comprises determining a ratio between a number of known registers and a number of unknown registers obtained from the disassembled form of the given executable file.

In some implementation of the method, the sections obtained from the disassembled form of the given executable file include at least one of: .text, .data, .bss, .rdata, .edata, .idata, .rsrc, .tls, and .reloc.

In some implementation of the method, the metadata extracted from the disassembled form of the given executable file comprises the file size and a number of code lines.

In some implementation of the method, the prediction outcome includes one of a binary prediction outcome and a probabilistic prediction outcome.

In some implementation of the method, the respective decisive priority of a given classifier in the ensemble of classifiers is determined based on one of: an accuracy associated with the given classifier, a completeness associated with the given classifier, and an F-measure associated with the given classifier.

In accordance with a second broad aspect of the present technology, there is provided a system for detecting malicious files in non-isolated environment. The system comprises a processor and a non-transitory computer-readable medium storing instructions. The processor upon executing the instructions, is configured to: during a training phase: acquire a plurality of executable files including at least one malicious executable file and at least one non-malicious executable file; analyze a given executable file, the analyzing comprising analyzing both a binary and disassembled form of the given executable file, to obtain: (i) data associated with the given executable file; (ii) a control-flow graph associated with the given executable file, and (iii) a data-flow graph associated with the given executable file; determine, based on the data, parameters of the given executable file; determine the parameters of the given executable file as being indicative of one of a malicious executable file and a non-malicious executable file; generate, based on the parameters, at least a first feature vector and a second feature vector; generate, based on the control-flow graph, a third feature vector; generate, based on the data-flow graph, a fourth feature vector, each one of the first feature vector, the second feature vector, the third feature vector, and the fourth feature vector being different from an other one thereof; and train an ensemble of classifiers to determine if a given in-use executable file is one of malicious and non-malicious, by: training a first classifier of the ensemble of classifiers based on the first feature vector; training a second classifiers of the ensemble of classifiers based on the second feature vector; training a third classifiers of the ensemble of classifiers based on the third feature vector; and training a fourth classifiers of the ensemble of classifiers based on the fourth feature vector; assign, to each one of the ensemble of classifiers, a respective decisive priority value, the respective decisive priority value being indicative of a respective weight assigned to a prediction outcome of a given classifier of the ensemble of classifiers, the respective weight having been determined based on prediction accuracy of the given classifier.

In some implementation of the system, during an in-use phase following the training phase, the processor is further configured to: obtain the given in-use executable file; generate a first in-use feature vector, a second in-use feature vector, a third in-use feature vector, and a fourth in-use feature vector associated with the given in-use executable file; feed the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and generate a report including the prediction outcome for presentation thereof to a user.

In accordance with a third broad aspect of the present technology, there is provided a computer-implementable method for detecting malicious files in non-isolated environment. The method is executable by a processor. The method comprises: during a training phase: acquiring, by the processor, a training set of data including a plurality of executable files, the plurality of executable files including at least one malicious executable file and at least one non-malicious executable file; and training, by the processor, based on the training set of data, an ensemble of classifiers to determine if a given in-use executable file is one of malicious and non-malicious, the training comprising: training a first classifier of the ensemble of classifiers based on a first plurality of feature vectors, a given one of the first plurality of feature vectors having been determined based on parameters associated with a respective one of the plurality of executable files; training a second classifiers of the ensemble of classifiers based on a second plurality of feature vectors, a given one of the second plurality of feature vectors having been determined based on the parameters associated with the respective one of the plurality of executable files; training a third classifiers of the ensemble of classifiers based on a third plurality of feature vectors, a given one of the third plurality of feature vectors having been determined based on a control-flow graph of the respective one of the plurality of executable files; and training a fourth classifiers of the ensemble of classifiers based on a fourth plurality of feature vectors, a given one of the fourth plurality of feature vectors having been determined based on a data-flow graph of the respective one of the plurality of executable files, each one of the given one of the first plurality of feature vectors, the given one of the second plurality of feature vectors, the given one of the third plurality of feature vectors, and the given one of the fourth plurality of feature vectors being different from an other one thereof; and assigning, by the processor, to each one of the ensemble of classifiers, a respective decisive priority value.

In some implementation of the method, the method further comprises during an in-use phase following the training phase: obtaining, by the processor, the given in-use executable file; generating, by the processor, a first in-use feature vector, a second in-use feature vector, a third in-use feature vector, and a fourth in-use feature vector associated with the given in-use executable file; feeding, by the processor, the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and generating a report including the prediction outcome for presentation thereof to a user.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to methods and systems to detect and block malicious files before execution thereof to prevent causing harm to computer systems.

Figure 1:
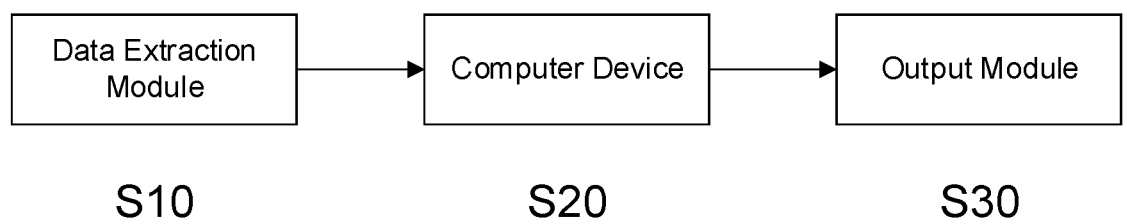
FIG. 1 depicts a schematic diagram of a system for detecting malicious files in a non-isolated environment, in accordance with certain non-limiting embodiments of the present technology.

With reference to FIG. 1, there is depicted a system 10 configurable for detecting malicious files in a non-isolated environment, in accordance with certain non-limiting embodiments of the present technology. The system 10 may comprise at least one of: a data extraction module (S10) configured to extract data from at least one executable file, a computer device (S20) configured to implement the method for detecting malicious files in non-isolated environment, and an output module (S30).

According to certain non-limiting embodiments of the present technology, each one of the data extraction module S10, the computer device S20, and the output module S30 can be implemented as a hardware module of the system 10 including all or some components of a computing environment 500 described below with reference to FIG. 5. Further it should be expressly understood that at least some of the data extraction module S10, the computer device S20, and the output module S30 can be implemented as a single hardware module including the computing environment 500, as will be described below.

Figure 2:
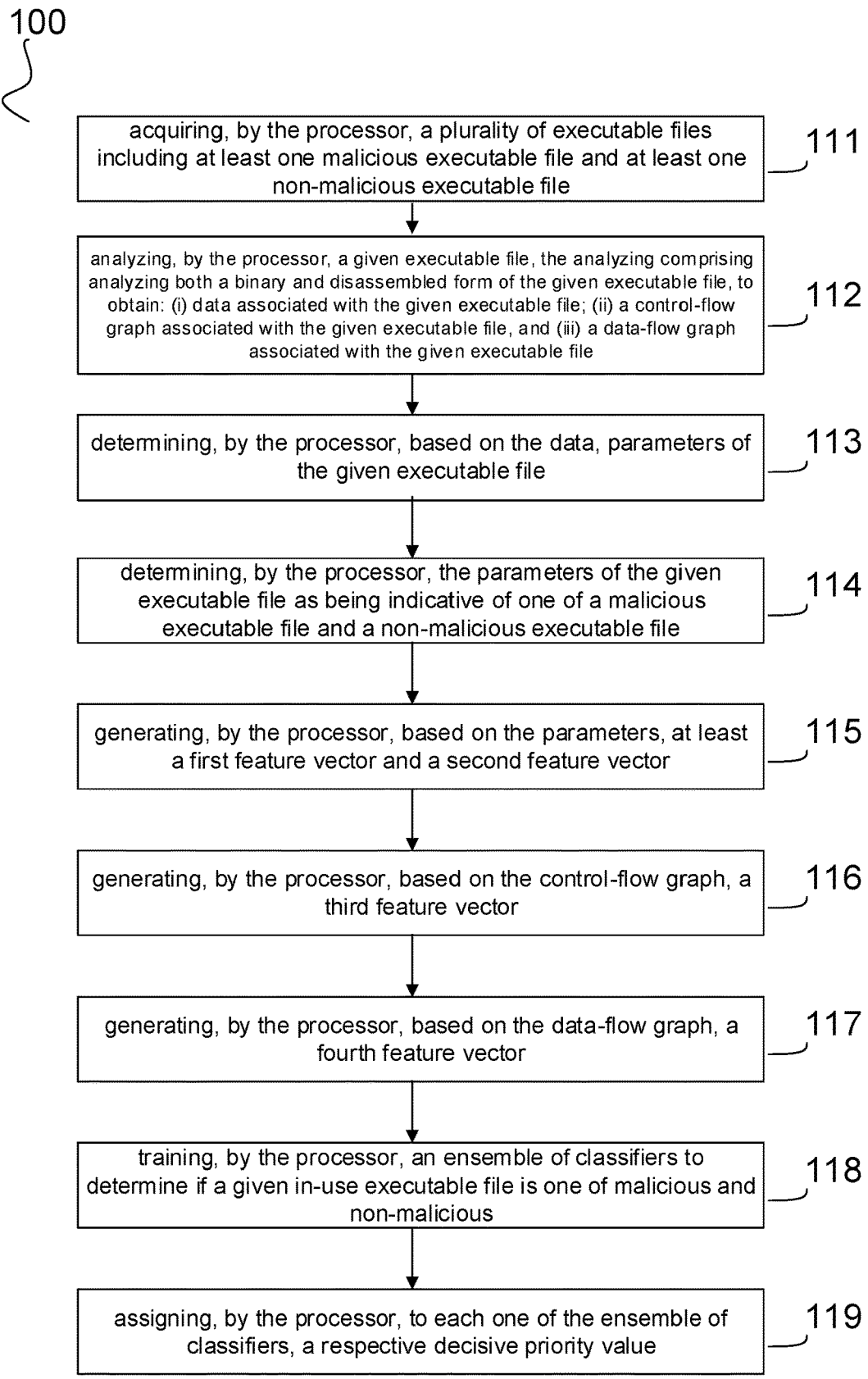
FIG. 2 depicts a flowchart diagram of a method of detecting malicious files in a non-isolated environment, in accordance with certain non-limiting embodiments of the present technology.

Withe reference to FIG. 2, there is depicted a flowchart diagram of a method 100 of detecting malicious files in a non-isolated environment, in accordance with certain non-limiting embodiments of the present technology. The method 100 can be executed by a processor 501 of the computing environment 500.

Step 111: Acquiring, by the Processor, a Plurality of Executable Files Including at Least One Malicious Executable File and at Least One Non-Malicious Executable File The method 100 commences at step 111 with the processor 501 being configured to acquire a plurality of executable files including at least one executable file known to be malicious and at least one executable file known to be non-malicious, or benign.

According to certain non-limiting embodiments of the present technology, the processor 501 can further be configured to use the plurality of executable files to generate, during a training phase, a training set of data for training a machine-learning algorithm (MLA) to determine whether an in-use executable file is malicious or not, as will be described in greater detail below.

It should be expressly understood that it is not limited how the MLA is implemented and in some non-limiting embodiments of the present technology can comprise an ensemble of classifiers, each of which comprises a forest of decision trees (such as a Random Forest), as an example. In another example, each classifier of the ensemble of classifiers can be implemented as an SVM-based classifier.

The method 100 thus proceeds to step 112.

Step 112: Analyzing, by the Processor, a Given Executable File, the Analyzing Comprising Analyzing Both a Binary and Disassembled Form of the Given Executable File, to Obtain: (I) Data Associated with the Given Executable File; (II) a Control-Flow Graph Associated with the Given Executable File, and (III) a Data-Flow Graph Associated with the Given Executable File;

Further, at step 112, in some non-limiting embodiments of the present technology, the processor 501 can be configured to analyze a given executable file, such as a binary and disassembled forms thereof. By doing so, the processor 501 can be configured to obtain data for generating the training set of data.

More specifically, in accordance with certain non-limiting embodiments of the present technology, for the given executable file, the processor 501 con be configured to obtain at least one of: (i) data associated with the given executable file; (ii) a control-flow graph associated with the given executable file, and (iii) a data-flow graph associated with the given executable file.

In the context of the present specification, the control-flow graph represents a variety of all possible ways of the given executable file being executed. Thus, use of the control-flow graph for static code analysis can be practical in finding unique ways of quick and optimal execution.

Further, in the context of the present specification, the data flow graph represents dependence of one variables from other ones taking into account their visibility and execution context, therefore the data flow analysis is directly related to the control flow analysis, since the latter provides the execution context.

Besides, it is also worth noting that the control-flow graph and the data flow graph can be obtained by constructing a finite-state automation for all possible variants of the sequence of system calls of the given executable file. Thus, the algorithm records cyclic and branching structures of the given executable file, enabling it to identify behavior variations and detect abnormalities. The ability to focus on a behavior of given executable file allows for shorter system training periods and a smaller number of false responses, and also lesser strain on the memory, such as a RAM 502 described below with reference to FIG. 5.

The method 100 hence advances to step 113.

Step 113: Determining, by the Processor, Based on the Data, Parameters of the Given Executable File Thus, at step 113, the processor 501 can be configured to determine, based on the data associated with the given executable file received at step 112, parameters of the given executable file.

Therefore, in some non-limiting embodiments of the present technology, the data can include at least one of: data from a PE-header associated with the given executable file, data from an Import Table associated with the given executable file, data from an Export Table associated with the given executable file, byte n-grams of a respective binary form of the given executable file, data of fields of the given executable file, file section entropy, metadata, string length distribution histograms, and the like.

More specifically, the processor 501 can be configured to determine, based on the obtained data associated with the given executable file, one or more of following parameters:

data from the Import Table to specify what external functions and from which modules are required for the given executable file to operate normally;

data from the Export Table specifying names and/or numbers of the exported functions with their position in the process virtual memory;

metadata from the given executable file header, for example, number of sections in the given executable file, creation time, processor type, operating system version, assembler version, total size of sections, checksum;

Byte/Entropy Histogram, modeling byte distribution in the given executable file, which can be generated by a sliding window of 1024 bytes moving in increments of 256 bytes in the respective binary form of the given executable file, as an example.

To determine byte n-grams, the processor 501 can be configured to extract a byte sequence of n bytes from the respective binary version of the given executable file, wherein each element of the byte sequence can have one of 256 values. Therefore, the processor 501 can be configured to obtain byte frequency histograms in the form of 256 length vectors, which represent frequency of occurrence of each value.

Further, the data of the fields of the given executable file can include, for example, without limitation, number of sections in the given executable file, size of headers, code size, availability (or otherwise presence) of a digital signature, names of imported DLL and functions where these libraries have been used, names of exported functions, data from a resource catalogue, an assembler version of the given executable file, a version of an operating system, processor type, total size of sections, checksum.

Further, based on the file section entropy, the processor 501 can be configured to determine, using a statistical analysis, whether a source (or a machine) code associated with the given executable file has been obfuscated or not. It is worth noting that malware is often transmitted in an encrypted form, accordingly a byte frequency is equalized thereby increasing the entropy.

More specifically, in some non-limiting embodiments of the present technology, the processor 501 can apply a method of sliding window to represent the respective binary version of the given executable file in a form of a set of entropy measures. Window entropy is calculated, and after calculation, for the purpose of this set characterization, the set of statistical measures is considered, for example, mathematical expectation, variance, quantile, percentile. Thus, for example, if the entropy is close to 1, i.e. occurrence of different characters is nearly the same, the code is determined as having been obfuscated and/or encrypted.

Further, to determine the string length histograms, the processor 501 can be configured to extract, from the respective binary form of the given executable file, all ASCII lines and determine their lengths.

Further, in some non-limiting embodiments of the present technology, the processor 501 can be configured to analyze a respective disassembled form of the given executable file.

By way of example, and not as limitation, the processor 501 can be configured to determine at least of the following parameters of the given executable file by analyzing the respective disassembled form thereof:
- characters, where characters mean frequency of occurrence of at least following characters: +, *,], [, ?, @, since they are specific to the code which tries to bypass the detection system, for example, by making indirect calls or downloading a dynamic library;
- registers, since the majority of register names characterize their purpose—therefore, the frequency of using unknown registers could be indicative of a harmfulness degree of malicious executable files. Besides, for further analysis such parameters are also introduced: number of known registers, number of unknown (renamed) registers, ratio between the known registers and the unknown ones, as an example;
- operation codes, wherein, the codes more frequently used by the malware are detected beforehand, and frequency of their occurrence in the code itself is also predetermined. Since the list of all instructions is rather big, the most popular operation codes stored, by the processor 501, in a system internal database (such as that hosted by a storage 503 described below with reference to FIG. 5) are used for analysis;
- a system interfaces (Windows APIs) access rate, wherein, it is also possible to use Windows APIs access rate for analysis, but since the number of such interfaces is too large, the most specific for the malware are selected and stored, by the processor 501, in the system internal database for the sake of improving the efficiency.
- sections of the respective disassembled form of the given executable file (executable PE file), including, for example, at least one of: .text, .data, .bss, .rdata, .edata, .idata, .rsrc, .tls and .reloc.

For example, parameters of these sections, which are used in the analysis by the processor, are non-exhaustively listed in the Table 1.

TABLE 1

| Parameter name | Meaning |
| --- | --- |
| bss_lines_number | number of lines in .bss section |
| data_lines_number | number of lines in .data section |
| edata_lines_number | number of lines in .edata section |

TABLE 1-continued

| Parameter name | Meaning |
| --- | --- |
| idata_lines_number | number of lines in .idata section |
| rdata_lines_number | number of lines in .rdata section |
| rsrc_lines_number | number of lines in .rsrc section |
| text_lines_number | number of lines in .text section |
| tls_lines_number | number of lines in .tls section |
| reloc_lines_number | number of lines in .reloc section |
| known_sections_number | total number of sections |
| unknown_sections_number | total number of unknown sections |
| known_sections_pr | proportion of known sections of total number |
| unknown_sections_pr | proportion of unknown sections of total number |
| .text_pr | proportion of .text section of the whole file |
| .data_pr | proportion of .data section of the whole file |
| .bss_pr | proportion of .bss section of the whole file |
| .rdata_pr | proportion of .rdata section of the whole file |
| .edata_pr | proportion of .edata section of the whole file |
| .idata_pr | proportion of .idata section of the whole file |
| .rsrc_pr | proportion of .rsrc section of the whole file |
| .tls_pr | proportion of .tls section of the whole file |
| .reloc_pr | proportion of .reloc section of the whole file |

Further, based on the respective disassembled form of the given executable file, the processor 501 can be configured to determine additional metadata thereof including a file size and a number of code lines of the given executable file.

The method 100 thus proceeds to step 114.

Step 114: Determining, by the Processor, the Parameters of the Given Executable File as being Indicative of One of a Malicious Executable File and a Non-Malicious Executable File Further, at step 114, the processor 501 can be configured to determine which of the parameters of the given executable file determined at step 113 are specific to malicious executable files and/or, vice versa, to non-malicious ones. To that end, the processor 501 can be configured to apply a statistical method.

More specifically, for example, it is possible to examine the given executable file for presence therein of a checksum as a parameter. Further, the processor 501 can be configured to determine missing checksum as being specific to malware. In another example, if a proportion of unknown sections to a total number of the given executable file is close to 1, it can be indicative of much obfuscation in the code, and the processor 501 can thus be configured to determine this parameter as being specific to malware. In yet another example, a proportion of known sections to the total number of section being close to 0, that is, everything being more or less standard, can be specific to legitimate, non-malicious, software. In yet another example, very frequent calls of certain API can also be specific to malware.

The method 100 hence advances to step 115.

Step 115: Generating, by the Processor, Based on the Parameters, at Least a First Feature Vector and a Second Feature Vector Further, having received the data associated of the given executable file and determined the parameters thereof, at step 115, the processor 501 can be configured to generate respective feature vectors for training the MLA to determine if the in-use executable file is malicious or not. To that end, first, the processor 501 can be configured to divide all the parameters associated with the given executable file, which have been determined at step 114, into numerical parameters and string parameters.

By way of example, in some non-limiting embodiments of the present technology, the numerical parameters can include, without limitation, a section entropy, size of each section, ratio between the number of known sections and unknown ones, proportion of .text sections of the given executable file, a number of lines in each section, a frequency of occurrence of code obfuscating characters (-, +, *,], [, ?, @), and others described above.

Further, the processor 501 can be configured to generate, based on the numerical parameters, a first feature vector for training a first classifier of the ensemble of classifiers.

More specifically, each cell of the first feature vector is predetermined for a respective numerical parameter. For example:
cell 1—known_sections_number=10;
cell 2—unknown_sections_pr=0.93 (proportion of unknown sections of total number);
cell 3—some_section_lines_number=505 (number of lines in a section);
n−1 cell—lines_number=5623 (number of code lines in the disassembled file);
n cell—file_size=10893 (file size in bytes).

As it can be appreciated, the processor 501 can further be configured to apply the steps described above with respect to the given executable file to other ones of the plurality of executable files and thus generate a first plurality of feature vectors, each of which includes respective numerical parameters associated with a respective one of the plurality of executable file, similarly to the first feature vector. It is worth noting that the vector length of each one of the first plurality of vectors depends on a number of numerical parameters identified, by the processor 501, for each one of the plurality of executable files, as described above.

Further, the processor 501 can be configured to train the first classifier of the ensemble of classifiers, based on the first plurality of feature vectors, to determine whether the in-use executable file is malicious or not. For example, the processor 501 can be configured to train the first classifier to generate a first prediction outcome indicative of maliciousness of the in-use executable file, such as 0 being indicative of a non-malicious executable file, and 1—malicious executable file.

Further, the string parameters can include, without limitation, names of exported functions, data from the resource catalogue, names of imported DLL and functions where these libraries have been used, and the like. Further, based on the string parameters, in some non-limiting embodiments of the present technology, the processor 501 can be configured to generate a second feature vector comprising Boolean values, each of which is indicative of whether a respective string parameter has been encountered by the processor 501 during the analysis, that is, whether it is present in the given executable file or not.

Thus, the processor 501 can be configured to generate the second feature vector having, for example, a following configuration:
each cell name being pre-associated with a respective string parameter of all possible string parameters; and
a given cell includes a value of one of True and False indicative of whether the respective parameter has been identified for the given executable file.

Additionally, in some non-limiting embodiments of the present technology, the processor 501 can be configured to apply, to the second feature vector an encoding algorithm to convert the contents of the second feature vector to Boolean values to reduce the required storage space in the storage 303.

Thus, the processor 501 can be configured to generate the second feature vector for training a second classifier of the ensemble of classifiers. As it can be appreciated, the processor 501 can further be configured to apply the steps described above with respect to the given executable file to other ones of the plurality of executable files and thus generate a second plurality of feature vectors, each of which is indicative of respective string parameters associated with a respective one of the plurality of executable file, similarly to the second feature vector.

Further, the processor 501 can be configured to train the second classifier of the ensemble of classifiers, based on the second plurality of feature vectors, to determine whether the in-use executable file is malicious or not. For example, the processor 501 can be configured to train the second classifier to generate a second prediction outcome indicative of maliciousness of the in-use executable file, such as 0 being indicative of a non-malicious executable file, and 1—malicious executable file.

The method 100 hence advances to step 116.

Step 116: Generating, by the Processor, Based on the Control-Flow Graph, a Third Feature Vector Further, after generating the first and second feature vectors, according to certain non-limiting embodiments of the present technology, the processor 501 can be configured to generate a third feature vector associated with the given executable file based on the control-flow graph obtained at step 112, as described above.

Figure 3:
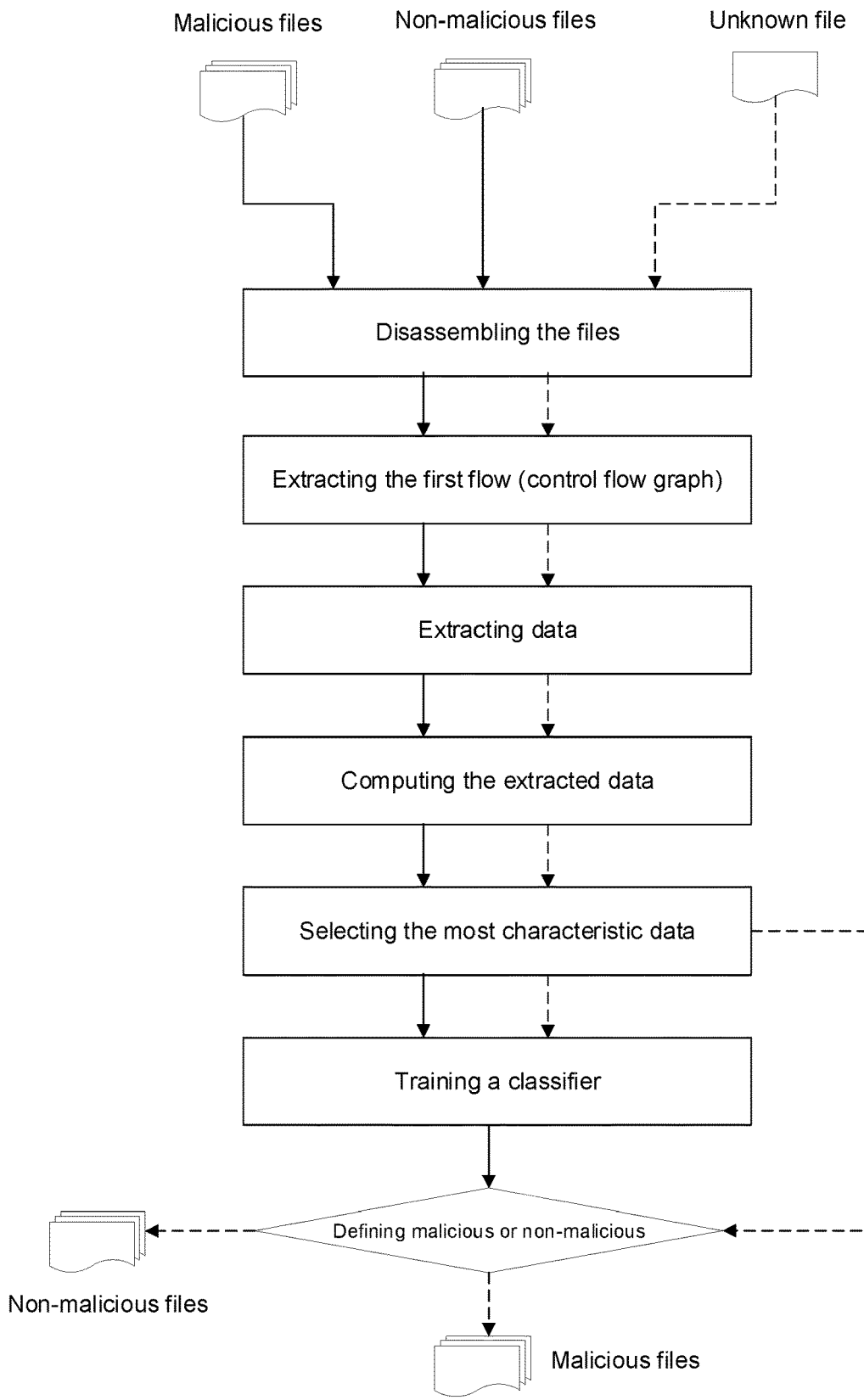
FIG. 3 depicts a flowchart diagram of analyzing executable files for maliciousness based on control-flow graphs thereof, in accordance with certain non-limiting embodiments of the present technology.

With reference to FIG. 3, there is depicted a flowchart diagram of the processor 501 generating feature vectors for executable files based on control-flow graphs associated therewith, in accordance with certain non-limiting embodiment of the present technology It should be noted that in the flowchart of FIG. 3, the training steps are depicted with a solid line, and in-use steps—with a dashed line.

As noted above, the control flow graph is a variety of all possible ways of the given executable file running, which are represented as a graph.

In some non-limiting embodiments of the present technology, the processor 501 can be configured to generate the control-flow graph. To that end, the processor can be configured to analyze the respective disassembled for of the given executable file, generated, for example, using IDA Pro. Also, if the given executable file has been packed by some packager, the processor 501 can be configured to unpack it using, for example, standard UPX packager of executable files.

Further, based on the respective disassembled form of the given executable file, the processor 501 can be configured to construct the control-flow graph for the given executable file. More specifically, in the control-flow graph, each node (point) of the graph corresponds to a respective basic block representative of a portion of the disassembled code that does not include either control transfer operation, nor points, where the control is transferred to from the other portions of the code. A first block instruction corresponds to a point in the control-flow graph to which the execution is transferred, and the last block instruction corresponds to an instruction to another block.

It should be noted that the control-flow graph thus constructed is an oriented graph. Directed arcs can be used in the control-flow graph to represent instructions for control transfer from one point to another. Also, in some non-limiting embodiments of the present technology, two special blocks can be added:

input block, through which control enters the graph; and
output block, which completes all the paths in this graph.

In specific non-limiting embodiments of the present technology, to generate, based on the respective disassembled form of the given executable file, the control-flow graph, the processor 501 can be configured to execute a script developed, for example, in Python, which uses standard APIs, e.g. IDA Pro to extract information about each block:

$$ClassTreeNode \begin{Bmatrix} BlockID(Numeric) \\ StartAddr(Hex) \\ EndAddr(Hex) \\ LeftChild(Pointer) \\ RightChild(Pointer) \end{Bmatrix}, \quad (1)$$

where BlockID—unique block ID, StartAddr—start address, EndAddr—end address, LeftChild—all assembler instructions comprised in the basic block, RightChild—descendant blocks (their unique block ID).

In some non-limiting embodiments of the present technology, when constructing the control-flow graph, the processor 501 can be configured to ignore cycles in the respective disassembled form as their consideration will result in infinitely long execution paths. Thus, based on the above data, the processor 501 can be configured to construct the control-flow graph associated with the given executable file.

Further, the processor 501 can be configured to represent the control-flow graph in a form of the operation code call sequence. To that end, the processor 501 can be configured to apply a modified algorithm of depth-first traversal to identify and reject cycles:

---

Counter = 0
Push Start$_{Node}$ on Stack
While Stack!= Empty do
Pop Stack
Curr$_{ExecPath}$ = Curr$_{ExecPath}$ ∪ Basic BlockID
Counter = Counter + 1
If Exists(RightChild) and RightChild ⊄ Curr$_{ExecPath}$
Push RightChild on Stack
Path$_{Len}$ = Path$_{Len}$ + Counter
  endif
  If NotExists(LeftChild) and LeftChild ⊂ Curr$_{ExecPath}$
  Total$_{ExecPath}$ = Total$_{ExecPath}$ + Curr$_{ExecPath}$
Delete_nodes_from Curr$_{ExecPath}$ till_last_added RightChild
  Adjust_Counter
  Elseif Exists(LeftChild) and LeftChild ⊄ Curr$_{ExecPath}$
  Push LeftChild on Stack
  endif
  endwhile
  Return Total$_{ExecPath}$

---

As a result, the processor 501 can be configured to generate a sequence of ID blocks thereby representing the control-flow graph in the form of the operation code sequence.

Further, in some non-limiting embodiments of the present technology, the processor 501 can be configured to go over each block in accordance with an order of its execution, extracting operation codes and rejecting their operands. Thus, the processor 501 can be configured to generate a profile of the given executable, which is represented by operation code sequence as illustrated below.

'xor', 'inc', 'nov', 'cnp', 'jz', 'nov', 'test', 'jnz', 'nov', "push', 'push', 'call', 'pop', 'pop', 'pop', 'nov', 'test', 'jnz', "push', 'push', 'call', 'cnp', 'jnz', 'nov', 'nov', 'nov', 'nov', 'cnp', 'call', 'pop', 'test', 'jnz', 'inc', 'jnp', 'call', 'push', 'push', 'call', 'xor', 'nov', 'nov', 'le 'push', 'push', 'call', 'test', 'jnz', 'inc', 'nov', 'cnp', 'nov', 'test', 'jnz', 'nov', 'cnp', 'jnz', 'push', 'push', 'call', 'pop', 'pop', 'nov', 'test', 'jnz', 'push', 'push', 'call', 'cnp' 'jz', 'cnp', 'jnz', 'cnp', 'jz, 'novzx', 'push', 'call, 'pop', 'test', 'jnz', 'inc', 'nov', 'jnp'.

Further, in some non-limiting embodiments of the present technology, the processor 501 can be configured to analyze trigrams of the operation code.

'cnp jbe test', 'jbe test jz', 'test jz cnp', 'jz cnp jnz', 'cnp jnz nov', 'jnz nov test', 'nov test jz', 'test', 'test jnz push', 'jnz push pop', 'push pop push', 'pop push push', 'push push push', 'push push push', 'cnp jaz cap', 'jnz cnp jnz', 'cnp jnz nov', 'jnz nov nov', 'nov nov jnp', 'nov jnp call', 'jnp call rein', 'push push call', 'push call xor', 'call xor nov', 'xor nov nov', 'nov nov lea', 'nov lea push', 'lea push call'.

Each such trigram will subsequently be a parameter in our system. Further, the processor 501 can be configured to convert these trigram profile associated with the given executable file from text to vector representation, thereby generating a third feature vector for training a third classifier of the ensemble of classifiers.

Needless to say, that similarly to generating the first and second pluralities of feature vectors, the processor 501 can further be configured to apply the step 116, described above with respect to the given executable file, to other ones of the plurality of executable files to generate a third plurality of feature vectors.

Further, the processor 501 can be configured to organize the third plurality of feature vectors in a matrix where rows are representative of executables files of the plurality of executable files and columns are representative of trigrams of associated profiles of the executable files as described above. In some non-limiting embodiments, the processor 501 can be configured to include in the matrix only unique trigrams associated with respective ones of the plurality of executable files.

Further, in some non-limiting embodiments of the present technology, the processor 501 can be configured to reduce dimensionality of each one of the third plurality of feature vectors by applying a tf-idf algorithm, which is required for estimation of word importance in a context of the respective disassembled form of the given executable file (profile of one PE file) in the plurality of the executable files.

Thus, similarly to the training the first and second classifiers, the processor 501 can be configured to feed the third plurality of feature vectors to the third classifier to train it to generate a third prediction outcome indicative of the in-use executable file being malicious.

The method thus advances to step 117.

Step 117: Generating, by the Processor, Based on the Data-Flow Graph, a Fourth Feature Vector At step 117, according to certain non-limiting embodiments of the present technology, the processor 501 can be configured to generate, based on the data-flow graph associated with the given executable file, a fourth feature vector for training a fourth classifier of the ensemble of classifiers. To that end, in some non-limiting embodiments of the present technology, the processor 501 can be configured to apply a data flow analysis to the given executable file.

In the context of the present specification, data flow analysis is a method to collect information about possible set of values, calculated in different points of the given executable file, which identifies what data passes therethrough.

Besides, the method of the data flow analysis execution, for example, could include setting data-flow equations for each node of the control-flow graph described above and solving them by multiple calculation of output with respect to input and data conversions locally in each node until the system has stabilized.

To conduct the data flow analysis, in some non-limiting embodiments of the present technology, the processor 501 can be configured to solve the problem of points definition in the given executable file where the variable has been defined, wherein each assignment is a definition, initially and up to what point it has been used until it is overwritten or deleted.

Therefore, d variable reaches p point, if there is such a path from the point following immediately after d to p point, such that d is not overwritten along this path. Each value defined in the given executable file or obtained during entering the given executable file relocates with a variety of other variables between the blocks of the control-flow graph, as schematically depicted by FIGS. 4A and 4B, in accordance with certain non-limiting embodiments of the present technology.

Figure 4B:
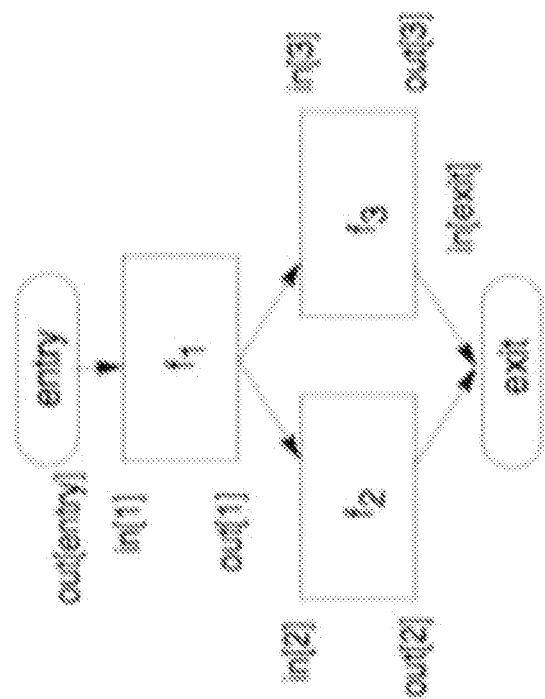
FIGS. 4A and 4B depict schematic diagrams of conducting a data-flow analysis of executable files, in accordance with certain non-limiting embodiments of the present technology.
Figure 4A:
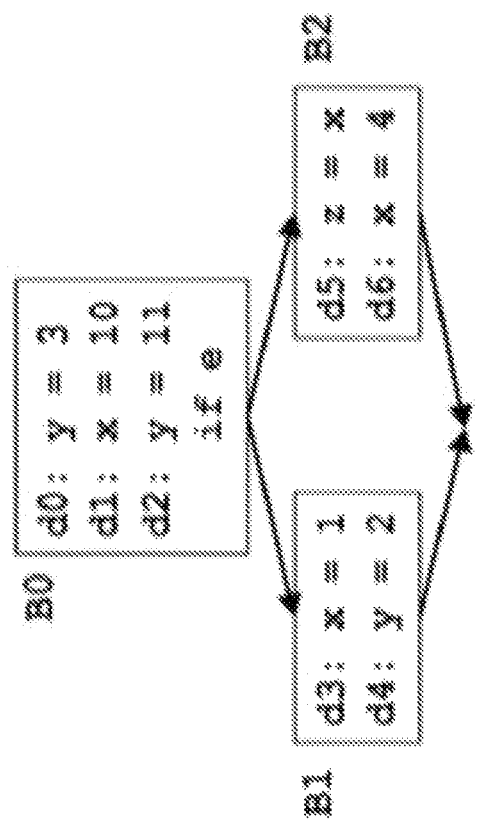

Thus, in FIGS. 4A and 4B, B0-B2 denote program blocks, D (definition)—definition of new variable, x,y—variable values, p—block in which d disappears (i.e. the variable has been defined somewhere, then the variable passes from in to out through the blocks and then enters p block, where it is deleted), and f (transfer function of the block), that is, a function which converts input into output.

Then, let us define the general form of equation for each block:

$$\text{out}[b] = \text{Gen}[b] \cup (\text{in}[b] - \text{Kill}[b]) \quad (2)$$

where:
Gen[b]—set of values generated in the block;
In[b]—input set of variables in block b;
Kill[b]—set of killed variables in block b;
Out[b]—output set of values.
Where, in[b]=out[p1]∪out[p2]∪ . . . ∪out[pn], where b—each block, p1 . . . pn—all previous blocks leading to this one.

For obtaining all input-output data in the control-flow graph blocks, the processor 501 can be configured to apply a following algorithm:

```
// Boundary condition
    out[Entry] = Ø
// Initialization for iterative algorithm
    For each basic block B other than Entry
        out[B] = Ø
// iterate
    While (Changes to any out[ ] occur) {
        For each basic block B other than Entry {
            in[B] = ∪ (out[p]), for all predecessors p of B
            out[B] = f_B(in[B])      // out[B]=gen[B]∪(in[B]-kill[B])
        }
```

Thus, after applying the depth-first traversal algorithm to delete cycles, the processor 501 can be configured to obtain a vector of block numbers in control-flow graph. Each block can be associated with two sets of variables (in and out). Thus, the processor 501 can be configured to obtain vectors of input and output sets of variables, wherein each cell comprises a set of input and output variables of each block, respectively.

Thus, for example, many types of malwares replicate themselves infecting other binary files or entering the code via other system processes. It often results in a nearly even distribution of data volumes of outbound edges of respective graph nodes of the control-flow graph.

Therefore, the processor 501 can be configured to generate a more informative vector from the obtained set of vectors, wherein each cell of the more informative vector which comprises a difference between capacities of the two sets: input and output variables of the respective block.

Then, using a number of statistical measures (standardized estimate, standard deviation, expected value, interquartile distance) with the obtained vector, and also calculating a window entropy of this vector and applying the same statistical measures to the obtained vector, the processor 501 can be configured to generate the fourth feature vector for training the fourth classifier of the ensemble of classifiers.

Similarly, the processor 501 can be configured to generate a fourth plurality of feature vectors by applying, mutatis mutandis, step 117 described above to each other one of the plurality of executable files.

The method 100 hence proceeds to step 118.

Step 118: Training, by the Processor, an Ensemble of Classifiers to Determine if a Given In-Use Executable File is One of Malicious and Non-Malicious Thus, the processor 501 can be configured to feed each one of the first plurality of feature vector, the second plurality of feature vector, the third plurality of feature vector, and the fourth plurality of feature vectors to a respective one of the first classifier, the second classifier, the third classifier, and the fourth classifier of the ensemble of classifiers. By doing so, the processor 501 can be configured to train each one of the first classifier, the second classifier, the third classifier, and the fourth classifier of the ensemble to determine a respective prediction outcome of whether the in-use executable file is malicious or not.

In some non-limiting embodiments of the present technology, a given prediction outcome can be one of:
binary (malicious/non-malicious);
probabilistic (if probability is above 50%, the file is considered to be malicious).

In additional non-limiting embodiments of the present technology, the processor 501 can be configured to train a fifth classifier of the ensemble of classifiers based on n-grams of operation code associated with the given executable file.

The method 100 thus advances to step 119.

Step 119: Assigning, by the Processor, to Each One of the Ensemble of Classifiers, a Respective Decisive Priority Value Further, at step 119, according to certain non-limiting embodiments of the present technology, the processor 501 can be configured to assign, to each one of the ensemble of classifiers, a respective decisive priority, which is indicative of a respective weight assigned to a respective prediction outcome of each one of the ensemble of classifiers. In some non-limiting embodiments of the present technology, the processor 501 can be configured to determine the respective weight based on a prediction accuracy of each one of the ensemble of classifiers for both classes of executable files, malicious and non-malicious.

Other metrics that can be used for determining the respective weights can include completeness and F-measure associated with each one of the ensemble of classifiers. More specifically, accuracy within the class denotes a proportion of executable files actually belonging to a given class relative to all the objects which a given classifier of the ensemble has identified as being associated with the given class; completeness denotes a proportion of all the executable files identified by the given classifier of the ensemble, which belong to the given class relative to all the executable files of the given class in the training set of data, and F-measure denotes a harmonic mean between accuracy and completeness, while it tends to zero, if accuracy or completeness tends to zero.

Thus, having trained the ensemble of classifier, in some non-limiting embodiments of the present technology, the processor 501 can further be configured to terminate the training phase of the method 100, and use, during an in-use phase, the ensemble of classifiers to determine whether the in-use executable file is malicious or not. To that end, the processor 501 can be configured to analyze the in-use executable file to generate a first in-use feature vector, a second in-use feature vector, a third in-use feature vector, and a fourth in-use feature vector associated therewith, as described above at step 111 to 116.

Further, the processor 501 can be configured to feed the first in-use feature vector, the second in-use feature vector, the third in-use feature vector, and the fourth in-use feature vector to the ensemble of classifiers to determine the prediction outcome of whether the in-use executable file is malicious or not.

As noted above, the prediction outcome can be binary (malicious/non-malicious) or probabilistic. In the latter case, the processor 501 can be configured to determine the in-use executable file as being malicious if the prediction outcome exceeds a predetermine probability threshold, such as 50%.

Further, in some non-limiting embodiments of the present technology, the processor 501 can be configured to generate a report including the prediction outcome associated with the in-use executable file for presentation thereof to a user.

The method 100 hence terminates.

Computing Environment

Figure 5:
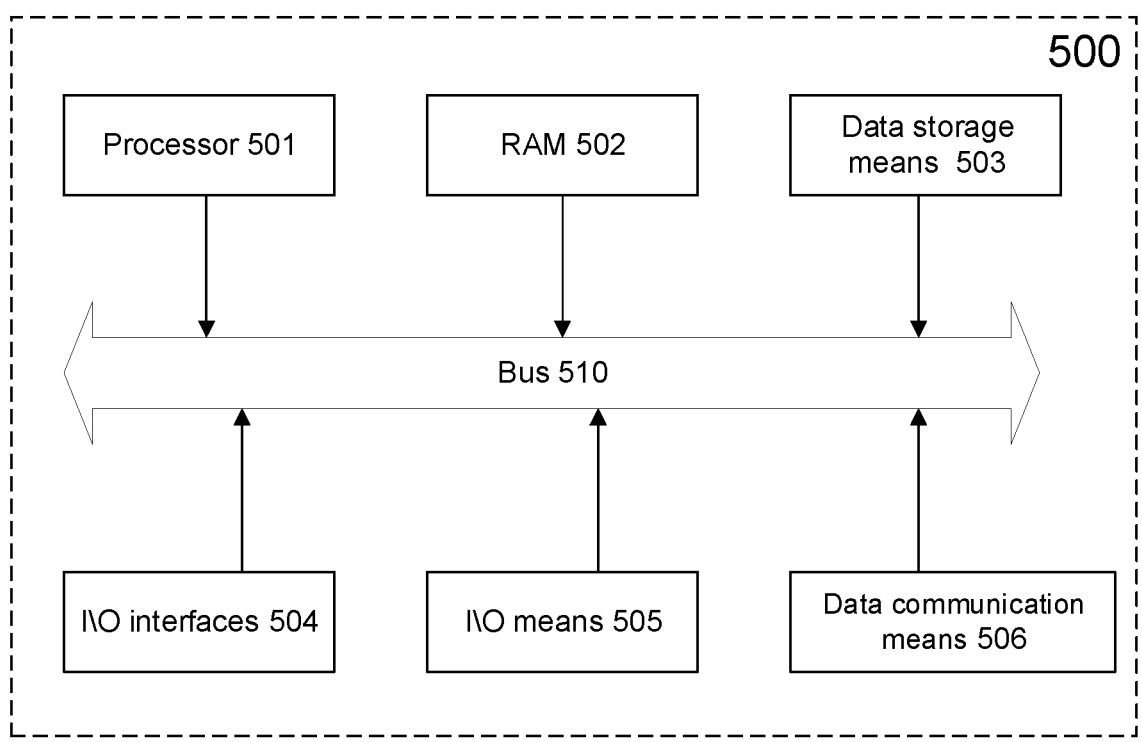
FIG. 5 a schematic diagram of an example computing environment configurable for execution of the present method of detecting malicious files in a non-isolated environment of FIG. 2, in accordance with certain non-limiting embodiments of the present technology

With reference to FIG. 5, there is depicted an example functional diagram of the computing environment 500 configurable to implement certain non-limiting embodiments of the present technology including the method 100, described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the method 100, as an example.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, a joystick, a (touchscreen) display, a projector, a touchpad, a mouse, a trackball, a stylus, speakers, a microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of a network, to which the computing environment 500 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of a WAN, a PAN, a LAN, an Intranet, the Internet, a WLAN, a WMAN, or a GSM network, as an example.

These and other components of the computing device 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to provide certain examples of implementation of the non-limiting embodiments of the present technology rather than to be limiting. The scope of the present technology is therefore intended to be limited solely by the scope of the appended claims.

The invention claimed is:

1. A computer-implementable method for detecting malicious files in non-isolated environment, the method comprising:
   during a training phase:
     acquiring plurality of executable files including at least one malicious executable file and at least one non-malicious executable file;
     analyzing a binary form of the given executable file to obtain a first data associated with the given executable file,
       the first data comprising a Byte/Entropy Histogram associated with the given executable file;
       the analyzing comprising analyzing at least one selected from the group consisting of: byte n-grams, data of fields of the given executable file, a file section entropy, metadata of the binary form of the given executable file, and line length distribution histograms;

analyzing a disassembled form of the given executable file to obtain: (i) a second data associated with the given executable file; (ii) a control-flow graph associated with the given executable file, and (iii) a data-flow graph associated with the given executable file, the second data being different from the first data;

determining based on data including the first and second data, parameters of the given executable file;

determining the parameters of the given executable file as being indicative of one of a malicious executable file and a non-malicious executable file;

generating, based on the parameters, at least a first feature vector and a second feature vector;

generating, based on the control-flow graph, a third feature vector;

generating, based on the data-flow graph, a fourth feature vector, each one of the first feature vector, the second feature vector, the third feature vector, and the fourth feature vector being different from an other one thereof; and training an ensemble of classifiers to determine if a given in-use executable file is one of malicious and non-malicious, the training comprising:

training a first classifier of the ensemble of classifiers based on the first feature vector;

training a second classifiers of the ensemble of classifiers based on the second feature vector;

training a third classifiers of the ensemble of classifiers based on the third feature vector; and training a fourth classifiers of the ensemble of classifiers based on the fourth feature vector;

assigning to each one of the ensemble of classifiers, a respective decisive priority value, the respective decisive priority value being indicative of a respective weight assigned to a prediction outcome of a given classifier of the ensemble of classifiers, the respective weight having been determined based on prediction accuracy of the given classifier.

2. The method of claim 1, further comprising, during an in-use phase following the training phase:

obtaining the given in-use executable file;

generating a first in-use feature vector, a second in-use feature vector, a third in-use feature vector, and a fourth in-use feature vector associated with the given in-use executable file;

feeding the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and generating a report including the prediction outcome for presentation thereof to a user.

3. The method of claim 1, wherein the first feature vector comprises numerical ones of the parameters of the given executable file, and the second vector comprises string ones of the parameters of the given executable file.

4. The method of claim 1, wherein obtaining the second data associated with the given executable file comprises obtaining at least one of: metadata, an Import Table, and an Export Table associated with the given executable file.

5. The method of claim 1, wherein the data of the fields of the given executable file comprises at least one of: a number of sections in the given executable file, a size of headers, a code size, an availability of digital signature, an availability of imported DLL and functions where these libraries have been used, names of exported functions, data from a resource catalog, and an assembler version of the given executable file.

6. The method of claim 1, wherein the file section entropy has been determined using a sliding window applied to the binary form of the given executable file.

7. The method of claim 4, wherein the metadata of the binary form of the given executable file comprises a number of sections in the file, sizes thereof, a presence of a checksum, a file size, a creation time, an operating system version, and an assembler version associated with the given executable file.

8. The method of claim 1, wherein analyzing the disassembled form of the given executable file comprises analyzing at least one of: characters, registers, operation codes, a system interface (Windows APIs) access rate, sections, and metadata, associated with the given executable file.

9. The method of claim 8, wherein the analyzing further comprises determining, in a code of the disassembled form of the given executable file, a frequency of occurrence of characters, including at least one of: "−", "+", "*", "]", "[", "?", "@".

10. The method of claim 7, wherein the analyzing further comprises determining a ratio between a number of known registers and a number of unknown registers obtained from the disassembled form of the given executable file.

11. The method of claim 8, wherein the sections obtained from the disassembled form of the given executable file include at least one of: .text, .data, .bss, .rdata, .edata, .idata, .rsrc, .tls, and .reloc.

12. The method of claim 7, wherein the metadata extracted from the disassembled form of the given executable file comprises the file size and a number of code lines.

13. The method of claim 2, wherein the prediction outcome includes one of a binary prediction outcome and a probabilistic prediction outcome.

14. The method of claim 1, wherein the respective decisive priority of a given classifier in the ensemble of classifiers is determined based on one of: an accuracy associated with the given classifier, a completeness associated with the given classifier, and an F-measure associated with the given classifier.

15. A system for detecting malicious files in non-isolated environment, the system comprising at least one processor and at least one non-transitory computer-readable medium storing instructions, which, when executed by the at least one processor, cause the system to:

during a training phase:

acquire a plurality of executable files including at least one malicious executable file and at least one non-malicious executable file;

analyze a binary form of the given executable file to obtain a first data associated with the given executable file, the first data comprising a Byte/Entropy Histogram associated with the given executable file, by:

analyzing at least one selected from the group consisting of: byte n-grams, data of fields of the given executable file, a file section entropy, metadata of the binary form of the given executable file, and line length distribution histograms;

analyze a disassembled form of the given executable file, to obtain: (i) a second data associated with the given executable file; (ii) a control-flow graph associated with the given executable file, and (iii) a data-flow graph associated with the given executable file,
    the second data being different from the first data;
determine, based on the data including the first and second data, parameters of the given executable file;
determine the parameters of the given executable file as being indicative of one of a malicious executable file and a non-malicious executable file;
generate, based on the parameters, at least a first feature vector and a second feature vector;
generate, based on the control-flow graph, a third feature vector;
generate, based on the data-flow graph, a fourth feature vector,
    each one of the first feature vector, the second feature vector, the third feature vector, and the fourth feature vector being different from an other one thereof; and
train an ensemble of classifiers to determine if a given in-use executable file is one of malicious and non-malicious, by:
    training a first classifier of the ensemble of classifiers based on the first feature vector;
    training a second classifiers of the ensemble of classifiers based on the second feature vector;
    training a third classifiers of the ensemble of classifiers based on the third feature vector; and
    training a fourth classifiers of the ensemble of classifiers based on the fourth feature vector;
assign, to each one of the ensemble of classifiers, a respective decisive priority value,
    the respective decisive priority value being indicative of a respective weight assigned to a prediction outcome of a given classifier of the ensemble of classifiers, the respective weight having been determined based on prediction accuracy of the given classifier.

16. The system of claim 15, wherein, during an in-use phase following the training phase, the processor is further configured to:
    obtain the given in-use executable file;
    generate a first in-use feature vector, a second in-use feature vector, a third in-use feature vector, and a fourth in-use feature vector associated with the given in-use executable file;
    feed the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and
    generate a report including the prediction outcome for presentation thereof to a user.

17. A computer-implementable method for detecting malicious files in non-isolated environment, the method comprising:
    during a training phase:
        acquiring a training set of data including a plurality of executable files, the plurality of executable files including at least one malicious executable file and at least one non-malicious executable file; and
        training, based on the training set of data, an ensemble of classifiers to determine if a given in-use executable file is one of malicious and non-malicious, the training comprising:
            training a first classifier of the ensemble of classifiers based on a first plurality of feature vectors,
                a given one of the first plurality of feature vectors having been determined based on parameters associated with a respective one of the plurality of executable files;
            training a second classifiers of the ensemble of classifiers based on a second plurality of feature vectors,
                a given one of the second plurality of feature vectors having been determined based on the parameters associated with the respective one of the plurality of executable files,
                the parameters having been determined based on first and second data obtained, for a given executable file of the plurality of executable files, respectively, based on analyzing (i) a binary form and (ii) a disassembled form of the given executable file,
                the first data comprising a Byte/Entropy Histogram associated with the given executable file;
                analyzing the binary form comprising analyzing at least one selected from the group consisting of: byte n-grams, data of fields of the given executable file, a file section entropy, metadata of the binary form of the given executable file, and line length distribution histograms; and
                the second data being different from the first data;
            training a third classifiers of the ensemble of classifiers based on a third plurality of feature vectors,
                a given one of the third plurality of feature vectors having been determined based on a control-flow graph of the respective one of the plurality of executable files; and
            training a fourth classifiers of the ensemble of classifiers based on a fourth plurality of feature vectors,
                a given one of the fourth plurality of feature vectors having been determined based on a data-flow graph of the respective one of the plurality of executable files,
                each one of the given one of the first plurality of feature vectors, the given one of the second plurality of feature vectors, the given one of the third plurality of feature vectors, and the given one of the fourth plurality of feature vectors being different from an other one thereof; and
            assigning, to each one of the ensemble of classifiers, a respective decisive priority value.

18. The method of claim 17, further comprising, during an in-use phase following the training phase:
    obtaining, by the processor, the given in-use executable file;
    generating, by the processor, a first in-use feature vector, a second in-use feature vector, a third in-use feature vector, and a fourth in-use feature vector associated with the given in-use executable file;
    feeding the first in-use feature vector, the second in-use feature vector, the third in-use feature vector, and the fourth in-use feature vector to the ensemble of classifiers to determine a prediction outcome indicative of whether the given in-use executable file is one of malicious and non-malicious; and generating a report including the prediction outcome for presentation thereof to a user.

* * * * *